US010033056B2

(12) United States Patent
Guidry et al.

(10) Patent No.: US 10,033,056 B2
(45) Date of Patent: Jul. 24, 2018

(54) FUEL CELL REGULATION USING LOSS RECOVERY SYSTEMS (71) Applicant: HONEYWELL INTERNATIONAL INC., Morristown, NJ (US)

(72) Inventors: Mike Guidry, Redondo Beach, CA (US); John Mason, Torrance, CA (US); Patrick Beresewicz, La Mirada, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 163 days.

(21) Appl. No.: 14/852,605

(22) Filed: Sep. 13, 2015

(65) Prior Publication Data
US 2017/0077534 A1 Mar. 16, 2017

(51) Int. Cl.
H01M 8/04 (2016.01)
H01M 8/04537 (2016.01)
H01M 8/04111 (2016.01)
H01M 8/04291 (2016.01)
H01M 8/04492 (2016.01)
(Continued)

(52) U.S. Cl.
CPC ......... H01M 8/04567 (2013.01); B60L 1/003 (2013.01); B60L 11/1883 (2013.01); H01M 8/04111 (2013.01); H01M 8/04291 (2013.01); H01M 8/04492 (2013.01); H01M 8/04507 (2013.01); H01M 8/04746 (2013.01); H01M 8/04761 (2013.01); H01M 8/04828 (2013.01); H02K 7/1823 (2013.01);
(Continued)

(58) Field of Classification Search
CPC ......... H01M 8/04111; H01M 8/04291; H01M 8/04507; H01M 8/04761; H01M 8/04492; H01M 8/04746; H01M 8/04828; H01M 2250/20; B60L 11/1883; H02K 7/1823
See application file for complete search history.

(56) References Cited

U.S. PATENT DOCUMENTS 4,901,530 A 2/1990 Kawamura
5,551,236 A 9/1996 Zimmer et al.
(Continued)

FOREIGN PATENT DOCUMENTS

DE 102012007377 A1 10/2013
GB 2337792 A 12/1999
(Continued)

OTHER PUBLICATIONS

McLarty et al. "Hybrid Fuel Cell Gas Turbine System Design and Optimization," Feb. 25, 2013.
(Continued)

Primary Examiner — Mark F. Huff
Assistant Examiner — Monique M Wills
(74) Attorney, Agent, or Firm — Lorenz & Kopf, LLP (57) ABSTRACT Systems and methods are provided for regulating fuel cell backpressure or humidity in conjunction with a flow control assembly that recovers energy resulting from the regulation. An exemplary vehicle system includes a fuel cell stack, a flow control valve to regulate a fluid flow exiting the fuel cell stack, and a flow control assembly parallel to the flow control valve to generate electrical energy in response to a bypass portion of the fluid flow that bypasses the flow control valve based on an orientation of the flow control valve with respect to the fluid flow.

20 Claims, 3 Drawing Sheets (51) Int. Cl.
*H01M 8/04746* (2016.01)
*H01M 8/04828* (2016.01)
*H02K 7/18* (2006.01)
*B60L 1/00* (2006.01)
*B60L 11/18* (2006.01)

(52) U.S. Cl.
CPC .......... *H01M 2250/20* (2013.01); *Y02T 10/92* (2013.01); *Y02T 90/32* (2013.01); *Y02T 90/34* (2013.01)

(56) References Cited

U.S. PATENT DOCUMENTS

| | | |
|---|---|---|
| 6,647,724 B1 | 11/2003 | Arnold et al. |
| 6,777,120 B2 | 8/2004 | Nelson et al. |
| 6,872,484 B2 | 3/2005 | Katagiri et al. |
| 6,939,631 B2 | 9/2005 | Formanski et al. |
| 7,456,517 B2 | 11/2008 | Campbell et al. |
| 7,892,689 B2 | 2/2011 | Kratschmar et al. |
| 8,173,311 B2 | 5/2012 | Lienkamp et al. |
| 8,446,029 B2 | 5/2013 | Smith et al. |
| 8,544,262 B2 | 10/2013 | Reyenga et al. |
| 8,584,459 B2 | 11/2013 | Richards |
| 8,642,194 B2 | 2/2014 | Osada et al. |
| 2002/0081471 A1 | 6/2002 | Keegan et al. |
| 2002/0163819 A1 | 11/2002 | Treece |
| 2011/0241344 A1 | 10/2011 | Smith et al. |
| 2011/0271936 A1 | 11/2011 | Reyenga et al. |
| 2014/0230436 A1 | 8/2014 | Wong |
| 2014/0248551 A1 | 9/2014 | Kumada et al. |
| 2015/0040860 A1 | 2/2015 | Reyenga et al. |
| 2015/0167467 A1 | 6/2015 | Reyenga et al. |
| 2015/0244007 A1* | 8/2015 | Nakamoto ........ H01M 8/04395 429/446 |

FOREIGN PATENT DOCUMENTS

| | | |
|---|---|---|
| JP | 2001351659 A | 12/2001 |
| JP | 2003039941 A | 2/2003 |
| JP | 2006286559 A | 10/2006 |
| WO | 9935702 A1 | 7/1999 |
| WO | 2011156056 A2 | 12/2011 |
| WO | 2012151383 A1 | 11/2012 |
| WO | 2014056811 A1 | 4/2014 |

OTHER PUBLICATIONS

McLarty et al. "Hybrid Fuel Cell Gas Turbine System Design and Optimization for SOFC" Jul. 31, 2010.
Love, A et al.; Temperature Management for Throttle Loss Recovery Systems, U.S. Appl. No. 14/827,746, filed Aug. 17, 2015.
Guidry, M et al.; Excess Power Dissipation for Throttle Loss Recovery Systems, U.S. Appl. No. 14/827,791, filed Aug. 17, 2015.
Love, A et al.; Temperature Management for Throttle Loss Recovery Systems, U.S. Appl. No. 14/827,828, filed Aug. 17, 2015.
Extended EP Search Report for Application No. 16188216.2-1360 dated Aug. 12, 2016.
EP Examination Report for Application No. 16188216.2 dated Feb. 14, 2018.

* cited by examiner

FUEL CELL REGULATION USING LOSS RECOVERY SYSTEMS

TECHNICAL FIELD

The subject matter described herein relates generally to flow control systems, and more particularly, to regulating fuel cell backpressure or humidity in conjunction with a flow control assembly that recovers energy resulting from the regulation.

BACKGROUND

In recent years, fuel cells have been utilized in an increasing number of applications. For example, a fuel cell stack may be utilized to supply electrical power for a traction motor in an electric vehicle. Typically, compressed air is supplied to one or more of the electrodes of the fuel cell to achieve efficient operation of the fuel cell. This airflow presents an opportunity for energy recovery downstream of the fuel cell. Accordingly, prior art systems have been developed that utilize a turbine to recover energy from the flow exiting the fuel cell. Traditionally, the turbine is mechanically coupled to the input air compressor via a common rotary shaft to leverage energy recovered by the turbine to power the compressor. However, this can increase the complexity when designing the turbocompressor assembly, and also, impose certain packaging or plumbing constraints when installed in an automotive vehicle. Additionally, unregulated airflow through the fuel cell can undesirably reduce the humidity of the fuel cell stack. Accordingly, it is desirable to provide a manner of recovering energy from the fuel cell stack that also affords control of the fuel cell airflow while also reducing packaging or plumbing constraints without compromising efficiency.

BRIEF SUMMARY

Turbine assemblies, throttle loss recovery systems, and related vehicle electrical systems and operating methods are provided. One exemplary vehicle system includes a fuel cell stack, a flow control valve to regulate a fluid flow exiting the fuel cell stack, and a flow control assembly parallel to the flow control valve to generate electrical energy in response to a bypass portion of the fluid flow bypassing the flow control valve based on an orientation of the flow control valve with respect to the fluid flow.

Another exemplary embodiment of a vehicle system includes a fuel cell stack, a conduit for an exit fluid flow from the fuel cell stack, a valve disposed within the conduit, and a turbine assembly to receive a bypass portion of the exit fluid flow based on an orientation of the valve with respect to the conduit.

An exemplary method of operating a turbine assembly involves obtaining humidity information for a fuel cell stack providing electrical power at an output voltage at an input node to a vehicle electrical system and adjusting an orientation of a valve downstream of the fuel cell stack based on the humidity information. The orientation of the valve influences electrical energy generated by the turbine assembly, and the method further provides the electrical energy from the turbine assembly to the input node at a voltage level corresponding to a voltage output of the fuel cell stack.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein relate to vehicle systems that include a flow control assembly that functions as a bypass for fluid flow around a flow control valve to generate energy from the bypassing fluid flow. For purposes of explanation, the subject matter is described herein in the context of a turbine assembly that functions as a bypass for a valve and includes an electrical generator that generates electrical energy. However, it should be appreciated that the subject matter described herein is not limited to use with turbines, and may be implemented in an equivalent manner for other suitable mechanical devices or flow control assemblies that are arranged to provide a bypass for another suitable flow control valve. Additionally, while the subject matter is described herein in the context of a the turbine assembly being configured as a turbo generator, the subject matter described herein is not limited to use with turbo generators and may be implemented in an equivalent manner for other suitable arrangements.

In exemplary embodiments described herein, the flow control valve is disposed within a conduit between a fuel cell stack and a vehicle exhaust system to regulate a fluid flow exiting the fuel cell stack, and thereby, regulate or otherwise manage the humidity of the fuel cell stack. The turbine assembly provides a fluid path that is parallel to the intermediate portion of the conduit having the valve disposed therein, such that the orientation of the valve with respect to the fluid flow influences the amount of the exiting fluid flow that bypasses the valve through the turbine. In exemplary embodiments, the generator output is coupled to the electrical output of the fuel cell stack to output generated electrical energy resulting from the bypassing portion of the fuel cell exit flow at a voltage level corresponding to the fuel cell output voltage. In exemplary embodiments, an electronics module is provided between the generator output and the fuel cell voltage output to control distribution of the generated electrical energy. In this regard, to prevent potential generator overspeed or excess energy generation, the electronics module may dissipate at least a portion of the generated electrical energy, or in some cases, output the generated electrical energy at a voltage that is less than vehicle electrical system bus voltage (or alternatively, less than the fuel cell output voltage) to effectively divert the generated electrical energy away from the vehicle electrical system.

Figure 1:
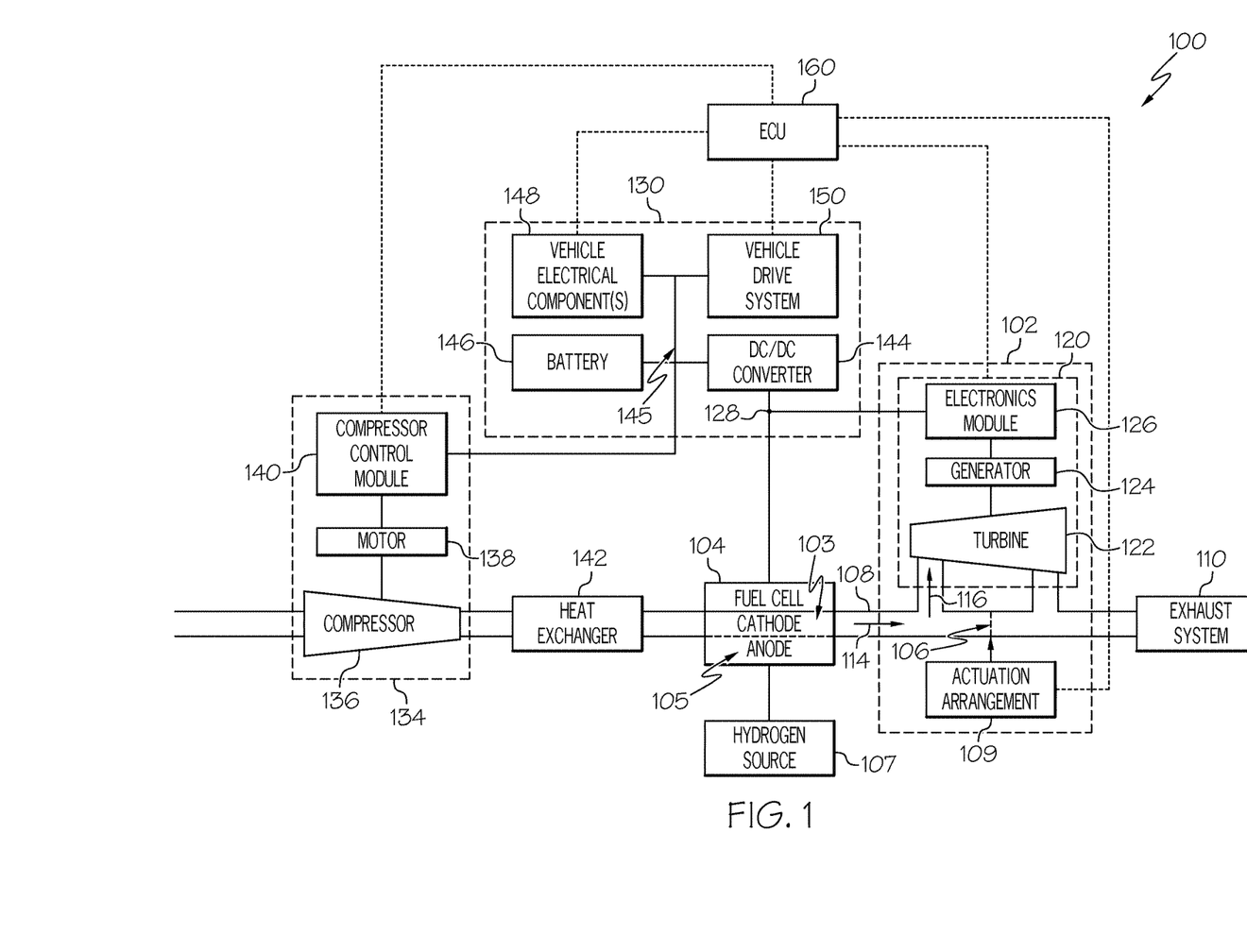
FIG. 1 is a block diagram of a vehicle system including a loss recovery assembly downstream of a fuel cell stack in one or more exemplary embodiments.

FIG. 1 depicts an exemplary embodiment of a vehicle system 100 suitable for use with an automotive vehicle that includes a loss recovery assembly 102 configured to modulate the flow of air downstream of a fuel cell stack 104, and thereby, regulate the backpressure of the airflow through the fuel cell stack 104 while also recovering energy from the exiting airflow. For the sake of brevity, the fuel cell stack 104 may alternatively be referred to herein as simply the fuel cell, however, it should be appreciated that in practice the fuel cell stack 104 may actually include a plurality of individual fuel cells which are stacked or otherwise configured to achieve a desired output power level.

As illustrated, the loss recovery assembly 102 includes a valve 106 (or throttle) disposed within a conduit 108 for air exiting the fuel cell stack 104 that is to be supplied to a vehicle exhaust system 110. A conduit 112 that adjoins the fuel cell outlet conduit 108 upstream of the valve 106 has an inlet configured to selectively receive at least a portion 116 of the fluid flow 114 exiting the fuel cell stack 104 that bypasses the valve 106 in a manner that is influenced by the orientation (or angle) of the valve 106 with respect to the fluid flow 114. In this regard, as the angle of the valve 106 with respect to the fluid flow 114 increases to restrict the exiting fluid flow 114 and increase the backpressure, the amount of fluid flow 116 bypassing the valve 106 through the conduit 112 increases, which, in turn, increases the potential electrical energy that may be generated by the loss recovery assembly 102. Conversely, as the angle of the valve 106 with respect to the exiting fluid flow 114 decreases to reduce the fuel cell backpressure, the amount of bypass fluid flow 116 entering the conduit 112 decreases.

The outlet of the conduit 112 is coupled to the inlet (or input) of a turbine assembly 120 to establish fluid communication between the fuel cell exhaust conduit 108 upstream of the valve 106 and the inlet of a turbine 122 of the turbine assembly 120. In this regard, the bypass fluid flow 116 functions as the turbine input fluid flow that passes through the volute, nozzle, or and/or vanes of the turbine 122 and impacts the blades (or wheel) of the turbine 122 to rotate the turbine 122. In one or more exemplary embodiments, the turbine 122 is realized as a fixed geometry turbine. The turbine assembly 120 also includes an electrical generator 124 coupled to the turbine 122 via a shaft, and the electrical generator 124 generates electrical energy in response to the rotation of the shaft caused by the turbine input fluid flow 116. The loss recovery assembly 102 includes another conduit 118 having its inlet coupled to the outlet of the turbine 122 and its outlet coupled to the fuel cell exhaust conduit 108 downstream of the valve 106 to establish fluid communication for the turbine output fluid flow. The turbine output fluid flow from the turbine 122 recombines with the remaining portion of the fuel cell exhaust flow that passes the valve 106 to provide the input fluid flow to the vehicle exhaust system 110.

Figure 2:
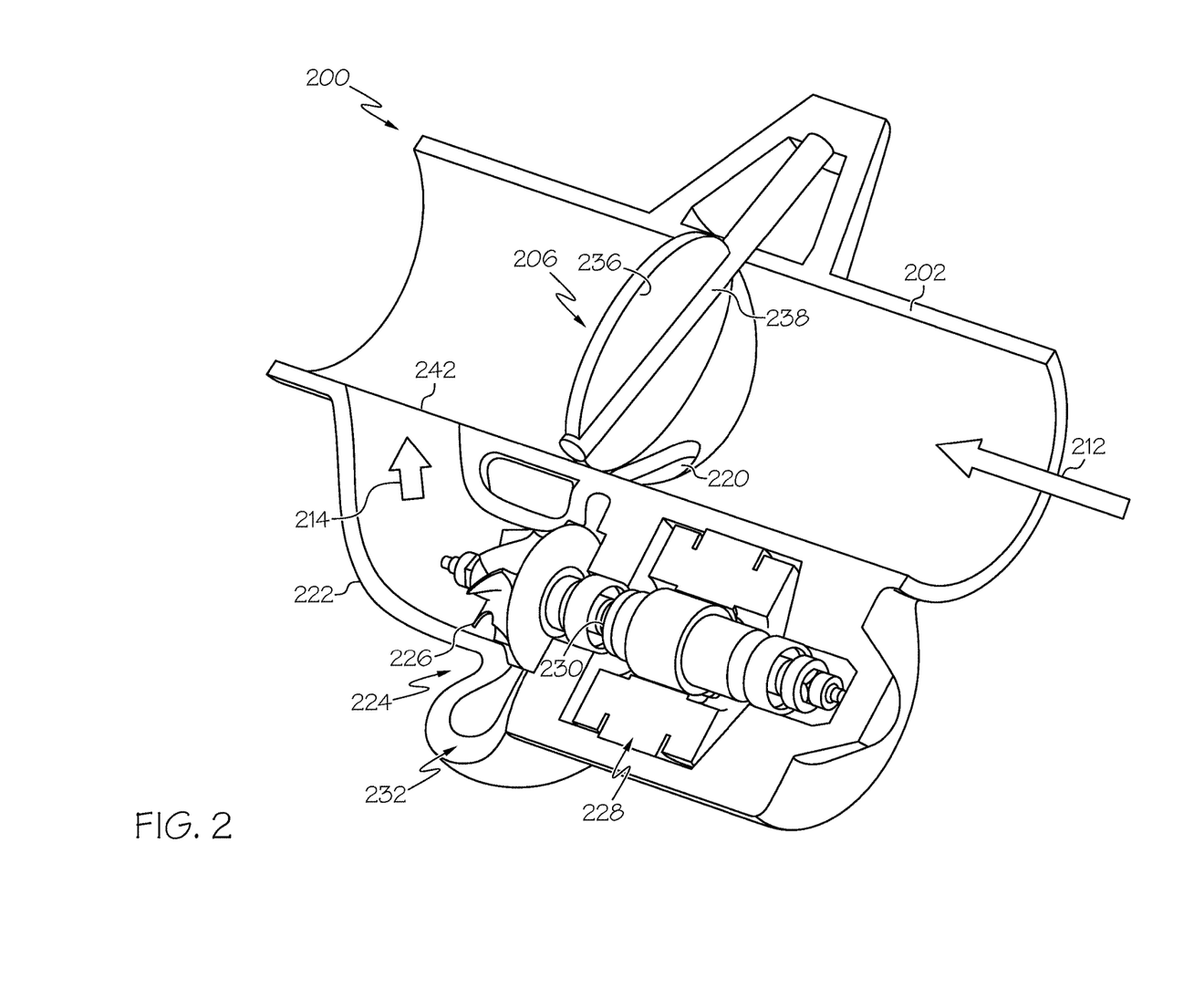
FIG. 2 is a cross-sectional view of a loss recovery assembly suitable for use in the vehicle system of FIG. 1 in an exemplary embodiment.

FIG. 2 depicts a cross-sectional view of an exemplary embodiment of a loss recovery assembly 200 suitable for use as the loss recovery assembly 102 in the vehicle system 100 of FIG. 1. In this regard, in some embodiments, the loss recovery assembly 200 may be realized as a unitary or integrated component that provides an intermediate portion of the conduit between the fuel cell stack 104 and the exhaust system 110.

The loss recovery assembly 200 includes a fluid conduit 202 which is configured to receive flow 212 of an input fluid (e.g., fluid flow 114) and a valve 206, is positioned in the fluid conduit 202. In the illustrated embodiment, the turbine inlet conduit includes an inlet 220 which may be defined at least in part by the intake conduit 202 and configured to selectively receive at least a portion of the input fluid flow 212 from the intake conduit 202. The turbine wheel 226 is mounted on a shaft 230 coupled to an electrical generator 228, which is configured to produce electrical energy when the turbine wheel 226 rotates. The illustrated turbine assembly 224 includes a volute 232, which substantially surrounds the turbine 226 and supplies the portion of the input fluid flow 212 received via the inlet 220 to the turbine 226. As illustrated, in some embodiments, the intake conduit 202, the turbine outlet conduit 222, and the volute 232 may be defined by an integral housing, which also retains the turbine 226 and the generator 228 to provide the loss recovery assembly 200 with a relatively compact form.

In exemplary embodiments, the valve 206 is configurable between multiple positions. For instance, in some embodiments, the valve 206 is realized as a butterfly valve that includes a throttle plate 236. An adjustment mechanism such as an electric motor or throttle cable may be configured to control the valve 206 by adjusting the position of the throttle plate 236, for example, by rotating a shaft 238 to which the throttle plate 236 is coupled about its longitudinal axis. In practice, a position sensor may detect the position of the throttle plate 236 or the shaft 238 and provide feedback as to the position of the throttle plate 236 such that the position of the valve 206 may be adjusted to achieve a desired intake fluid flow downstream of the valve 206. In this regard, FIG. 2 depicts the valve 206 opened to a point at which the inlet 220 to the turbine 226 is substantially fully unblocked. Thus, the turbine assembly 224 acts as a bypass around the valve 206 when at least a portion of the inlet 220 is not obstructed by the throttle plate 236. At least a portion of the input fluid flow 212 enters the volute 232 via the inlet 220, which feeds the turbine 226, and the turbine output fluid flow 214 exiting the turbine 226 passes through the turbine outlet conduit 222 and reenters the intake conduit 202 downstream of the valve 206 via an outlet 242. As illustrated, the outlet 242 may be defined by an opening in the sidewall of the intake conduit 202 downstream of the valve 206. It will be appreciated that the orientation of the throttle plate 236 with respect to the input fluid flow 212 will vary during operation, which, in turn, will vary the amount of the input fluid flow 212 that is redirected or otherwise bypasses the throttle via the turbine assembly 224.

Referring again to FIG. 1, the loss recovery assembly 102 also includes an electronics module 126 that is coupled between the electrical output of the generator 124 and an input node 128 of the vehicle electrical system 130. The electronics module 126 includes the electrical elements or components that are configured to receive the electrical energy generated by the generator 124 and provide an interface between the output of the generator 124 and the vehicle electrical system 130 for delivering the electrical energy generated by the loss recovery assembly 102 to the vehicle electrical system 130. For example, the electronics module 126 may include a rectifier configured to rectify the output of the generator 124 to a direct current (DC) voltage level corresponding to the voltage level at the node 128 of the vehicle electrical system 130. In exemplary embodiments, the node 128 is an input node for receiving the voltage output from the electrical output of the fuel cell 104, and thus, the electrical output of the loss recovery assembly 102 is coupled to the electrical output of the fuel cell 104 at a common voltage level. Thus, the generator 124 and the rectification provided by the electronics module 126 are designed or otherwise configured to produce an output voltage substantially equal to the output voltage of the fuel cell 104.

Additionally, in some embodiments, the electronics module 126 may include resistors, capacitors, inductors, diodes, transistors, and/or other electrical circuit elements configured to dissipate at least a portion of the electrical energy generated by the generator 124 to prevent a potential overspeed condition with respect to the turbine 122 or an excess energy condition with respect to the vehicle electrical system 130, as described in greater detail below in the context of FIG. 3. In some embodiments, the electronics module 126 is capable of varying the voltage output provided to the vehicle electrical system 130 by dissipating at least a portion of the electrical energy generated by the generator 124 at the electronics module 126. In this regard, the electronics module 126 may include a silicon controller rectifier, switching arrangement, or other electrical component that may be operated to dissipate electrical energy at the electronics module 126 to maintain the output voltage provided to the vehicle electrical system 130 at a target voltage set point provided by an electronic control unit (ECU) 160. For example, the electronics module 126 may include a field-effect transistor (FET) configured parallel to the generator output that is pulsed, switched, or otherwise activated with a duty cycle that results in the FET dissipating a portion of the generated electrical energy that results in the voltage output by the rectifier of the electronics module 126 being substantially equal to the target voltage set point from the ECU 160.

In the illustrated embodiment, the loss recovery assembly 102 also includes an electronically-controlled actuation arrangement 109 that is coupled to the valve 106 and configured to control the orientation of the valve 106 with respect to the fluid flow 114 (e.g., the size of the opening provided within the conduit 108) in response to a valve position command. In this regard, the actuation arrangement 109 may include one or more cables, linkages, motors, or the like, such as is found with an electronically-controlled throttle. In the illustrated embodiment, the actuation arrangement 109 is coupled to the ECU 160 to receive valve position commands from the ECU 160 that result in a desired backpressure for the fluid flow 114 exiting the fuel cell stack 104, and thereby, achieve a desired humidity within the fuel cell stack 104. That said, in other embodiments, the actuation arrangement 109 may be coupled to the electronics module 126, which may act as an intermediary that commands or otherwise controls operation of the actuation arrangement 109 based on signals or instructions received from the ECU 160.

Still referring to FIG. 1, as illustrated, a compressor assembly 134 is provided upstream of the fuel cell 104 to receive intake air (e.g., via an air filter of the like) and compress the air to achieve a desired operation of the fuel cell 104. The illustrated compressor assembly 134 includes a compressor 136 in the intake fluid flow path upstream of the fuel cell 104, a motor 138 coupled to the compressor 136 (e.g., via a common rotary shaft), and a compressor control module 140 coupled to the motor 138 and configured to operate the motor 138 responsive to commands or instructions received from the ECU 160 to achieve a desired rotational velocity, and thereby compression ratio, for the compressor 136. In this regard, the compressor control module 140 may include control hardware (e.g., a microcontroller, a microprocessor, or the like), power conversion hardware (e.g., an inverter), or another suitable combination of electrical components configured to support operation of the compressor motor 138, and thereby the compressor 136, in response to signals or commands received from the ECU 160.

Downstream of the compressor assembly 134, a heat exchanger 142 cools the compressed airflow that is provided to the air inlet to the cathode electrode 103 of the fuel cell 104. An inlet of the anode electrode 105 is coupled to a fuel source, such as hydrogen source 107, to receive or otherwise obtain the fuel that is oxidized into ions and electrons. The compressed air input to the cathode electrode 103 reacts with the byproducts of the reaction at the anode electrode 105 to provide the fluid flow 114 that then exits the outlet of the cathode electrode 103. An electrical output of the fuel cell 104 is connected to a corresponding fuel cell voltage input node 128 of the vehicle electrical system 130 to provide electrical energy to the vehicle electrical system 130 as desired.

In the illustrated embodiment, the vehicle electrical system 130 includes a DC-to-DC power converter 144 having its input connected to the fuel cell voltage input node 128 and its output connected to a voltage bus 145 having a DC voltage level corresponding to the vehicle battery 146. In this regard, when the DC voltage level output by the fuel cell 104 is different from the DC voltage level of the battery 146, the DC-to-DC converter 144 converts the voltage level at the input node 128 to a corresponding input electrical current at the DC voltage level of the voltage bus 145. For example, the output voltage of the fuel cell 104 may be on the order of 100 Volts or more, while the battery 146 has a nominal voltage of about 12 V to about 14 V, where the DC-to-DC converter 144 converts the fuel cell output voltage to the battery voltage level. That said, in some embodiments, the fuel cell output voltage (and also, the output voltage of the recovery assembly 102) may be matched to the battery voltage, in which case, the DC-to-DC converter 144 need not be present. In the illustrated embodiment, one or more additional vehicle electrical components 148 may be coupled to the voltage bus 145 to receive input power for their operation. Additionally, the vehicle drive system 150 (e.g., the drive electronics for an electric traction motor) may be coupled to the voltage bus 145 to receive input electrical power used to provide traction for the vehicle.

The ECU 160 generally represents the engine control unit or another combination of one or more supervisory electronic control units configured to support operation of the vehicle system 100 described herein. The ECU 160 is coupled to the vehicle drive system 150 and configured to provide commands or instructions for operating the vehicle traction system responsive to driver input or feedback, such as depressing a gas pedal, a brake pedal, or the like. Additionally, the ECU 160 may be coupled to the various vehicle electrical components 148 within the vehicle electrical system 130 to control their operation based on input or selections from a driver or other vehicle occupant, and thereby, control their consumption of electrical power from the voltage bus 145. The ECU 160 is also coupled to the compressor control module 140, the valve actuation arrangement 109, and the electronics module 126 of the loss recovery assembly 102 to support operations of the compressor 136 and the turbine assembly 120 that achieve a desired operation of the fuel cell 104, as described in greater detail below. In this regard, although not depicted in FIG. 1 for purposes of clarity, in practice, the ECU 160 may also be coupled to the fuel cell 104 or one or more components thereof (e.g., a fuel cell controller, humidity sensors, pressure sensors, or the like) that are configured to support the processes, tasks, and operations described herein. Moreover, in some embodiments, the ECU 160 may also be coupled to the hydrogen source 107 to control or otherwise influence the amount or rate of the input fuel flow to the anode inlet of the fuel cell stack 104.

Figure 3:
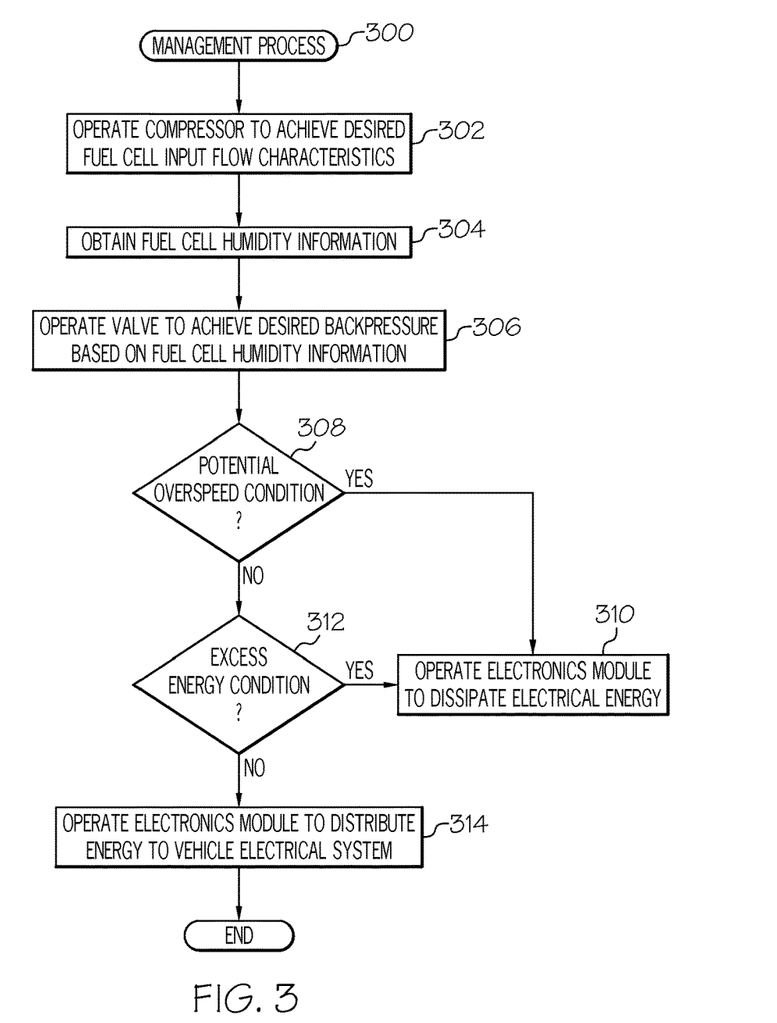
FIG. 3 is a flow diagram of an exemplary management process suitable for use with the vehicle system of FIG. 1 in accordance with one or more embodiments.

FIG. 3 depicts an exemplary embodiment of a management process 300 suitable for implementation in a vehicle system to regulate the humidity and airflow experienced by an electrode of a fuel cell stack to achieve a desired operation of the fuel cell stack. For illustrative purposes, the following description may refer to elements mentioned above in connection with FIGS. 1-2. In practice, portions of the management process 300 may be performed by different elements of the vehicle system 100, such as, the ECU 160, the electronics module 126, the actuation arrangement 109, the compressor control module 140, or the fuel cell stack 104. It should be appreciated that practical embodiments of the management process 300 may include any number of additional or alternative tasks, the tasks need not be performed in the illustrated order and/or the tasks may be performed concurrently, and/or the management process 300 may be incorporated into a more comprehensive procedure or process having additional functionality not described in detail herein. Moreover, one or more of the tasks shown and described in the context of FIG. 3 could be omitted from a practical embodiment of the management process 300 as long as the intended overall functionality remains intact.

In exemplary embodiments, the management process 300 begins by operating the compressor assembly to achieve the desired input airflow to the cathode electrode of the fuel cell stack (task 302). In this regard, the ECU 160 commands, signals, or otherwise instructs the compressor control module 140 to operate the motor 138, and thereby the compressor 134, to achieve a desired air pressure at the inlet to the cathode 103. For example, the ECU 160 may receive feedback indicative of one or more of the ambient air pressure, the fuel flow rate at the inlet to the anode 105, the current power consumption associated with the voltage bus 145 (e.g., the power needs of the vehicle drive system 150 and/or the vehicle electrical components 148), and based thereon, determine an optimal input pressure for the input airflow to the cathode 103 to achieve a desired power output. From there, the ECU 160 calculates or otherwise determines commands or instructions for operating the compressor 136 of the compressor assembly 134 to achieve the compression ratio that results in that optimal input pressure at the cathode inlet. It should be noted that by virtue of the compressor assembly 134 being physically and electrically separate from the turbine assembly 120, the components of the compressor assembly 134 (namely the compressor 136 and the motor 138) may be designed or otherwise optimized for an average or nominal airflow to the fuel cell stack 104. In other words, the compressor 136 may be sized to achieve a desired amount of compression, with the compressor motor 138 then being matched to the compressor input power for achieving that amount of compression.

The illustrated management process 300 continues by receiving or otherwise obtaining information indicative of the current humidity of the fuel cell stack and operating the valve of the loss recovery system based on the current humidity information (tasks 304, 306). For example, the fuel cell stack 104 may include a humidity sensor configured to measure or otherwise quantify the current humidity of the cathode 103 of the fuel cell 104. The ECU 160 may be coupled to a humidity sensor (either directly or indirectly via a fuel cell control module) to receive or otherwise obtain a current measurement value for the humidity of the cathode 103, and based thereon, determine how to operate the valve 106 of the loss recovery assembly 102. In alternative embodiments, the electronics module 126 may be coupled to the fuel cell 104 to determine how to operate the valve 106 of the loss recovery assembly 102 based on the current humidity information, or a fuel cell control module determine whether humidity should be increased or decreased or otherwise how to operate the valve 106 and provide a corresponding indication to the ECU 160 or electronics module 126.

In one embodiment, the ECU 160 determines whether the current humidity is less than or greater than a target humidity value, and operates the valve 106 based on the difference. For example, based on one or more factors, the ECU 160 may determine an optimal humidity level for operating the fuel cell 104 most efficiently, and then compare the current humidity measurement value to that targeted humidity value. When the current humidity is greater than the optimal humidity, the ECU 160 signals, commands, or otherwise instructs the actuation arrangement 109 to adjust the orientation of the valve 106 to increase the size of the opening within the conduit 108 (or decrease the angle of the valve 106 with respect to the flow 114), thereby reducing the backpressure, which, in turn, facilitates a less restricted cathode exit flow 114 that is capable of lowering the humidity of the cathode 103. Alternatively, when the current humidity is less than the optimal humidity, the ECU 160 signals, commands, or otherwise instructs the actuation arrangement 109 to adjust the orientation of the valve 106 to decrease the size of the opening within the conduit 108 (or increase the angle of the valve 106 with respect to the flow 114), thereby increasing the backpressure, which, in turn, restricts the cathode exit flow 114 to facilitate increasing or maintaining the humidity of the cathode 103. In some embodiments, the ECU 160 may calculate the amount by which the angle of the valve 106 should be adjusted based on the magnitude of the difference between the current humidity value and the target humidity value and the mass flow rate associated with the current exit flow 114.

In another embodiment, the ECU 160 may determine whether the current humidity is less than or equal to a minimum humidity threshold, or alternatively, greater than a maximum humidity threshold. In response to determining the current humidity is less than or equal to the minimum humidity threshold, the ECU 160 signals, commands, or otherwise instructs the actuation arrangement 109 to adjust the orientation of the valve 106 to decrease the size of the opening within the conduit 108 and increase the backpressure. Conversely, in response to determining the current humidity is less than or equal to the minimum humidity threshold, the ECU 160 signals, commands, or otherwise instructs the actuation arrangement 109 to adjust the orientation of the valve 106 to increase the size of the opening within the conduit 108 and decrease the backpressure.

Still referring to FIG. 3, in exemplary embodiments, the management process 300 continues by detecting or otherwise identifying the presence of a potential generator overspeed condition, and in response, operates the electronics module of the loss recovery assembly to dissipate energy to mitigate the potential overspeed condition (tasks 308, 310). In this regard, when the turbine 122 has a fixed geometry, at certain orientations of the valve 106 in combination of the mass flow rate of the cathode exit flow 114, the turbine input flow 116 may cause the turbine 122 to rotate at a speed that could exceed the design limit of the generator 124. Thus, to prevent potential generator overspeed, the ECU 160 may signal, command, or otherwise instruct the electronics module 126 to effectively short-circuit the electrical output of the generator 124 through a resistive path or otherwise increase the electrical loading of the generator 124, thereby preventing an overspeed condition. For example, based on the current power consumption associated with the voltage bus 145 being less than the combined power output of the fuel cell 104 and the generator 124, the ECU 160 may determine a potential overspeed condition exists, and in response, signal the electronics module 126 to dissipate at least a portion of the electrical output from the generator 124 to mitigate the potential overspeed condition. In some embodiments, the ECU 160 may receive a generator speed feedback signal and detect a potential overspeed condition based on the current generator speed being greater than a threshold value. In response to an overspeed condition, the ECU 160 may reduce the target voltage set point provided to the electronics module 126 from the current voltage output of the fuel cell 104 at node 128 to some lesser value that results in the electronics module 126 dissipating at least a portion of the generated electrical energy.

Additionally, the management process 300 may detect or otherwise identify the presence of a potential excess energy condition, and in response, operate the electronics module of the loss recovery assembly to dissipate energy to mitigate the potential excess energy condition (tasks 310, 312). For example, depending on the orientation of the valve 106 and the mass flow rate of the cathode exit flow 114, the power generated by the generator 124, when combined with the power output provided by the fuel cell 104, may be greater than the power handling capability of the voltage bus 145 (e.g., the battery 146 is fully charged, vehicle electrical components 148 are turned off, and the like). Thus, to prevent overcharging of the battery 146 or otherwise providing excess energy to the vehicle electrical system 130, the ECU 160 signals the electronics module 126 to dissipate at least a portion of the electrical output from the generator 124 (e.g., by reducing the target voltage set point) to reduce the input power to the vehicle electrical system 130 at node 128. For example, based on the current speed of the vehicle (or the current loading of the vehicle drive system 150), the current state of charge and/or output voltage of the battery 146, the current output power of the fuel cell 104, the orientation of the valve 106, and the mass flow rate of the cathode exit flow 114, the ECU 160 may calculate, estimate, or otherwise determine the amount of excess power to be dissipated based on the difference between the total input power (e.g., the sum of the fuel cell 104 power output and the generator 124 power output) and the current power handling capability of the voltage bus 145. The ECU 160 then operates the electronics module 126 of the loss recovery assembly 102 to dissipate the amount of excess power. In one embodiment, the target voltage set point provided to the electronics module 126 is set to a voltage that is less than or equal to the voltage of the voltage bus 145, thereby ensuring that the turbine assembly 120 does not contribute any current to the voltage bus 145.

In the absence of a potential excess energy condition or a potential overspeed condition, the management process 300 operates the electronics module of the loss recovery assembly to distribute the generated electrical energy to the vehicle electrical system (task 314). In this regard, the ECU 160 signals or otherwise commands the electronics module 126 to output a voltage substantially equal to the fuel cell output voltage at node 128 (e.g., by setting a target voltage set point to the fuel cell output voltage). For example, the ECU 160 may be coupled to the fuel cell voltage input node 128 or the fuel cell voltage output to measure the current fuel cell voltage output, and based thereon, the ECU 160 may command the electronics module 126 for a target voltage set point equal to the current fuel cell voltage measurement. Thus, the electrical power generated by the turbine assembly 120 is provided to the input node 128 of the vehicle electrical system 130 at the voltage level of the fuel cell 104 and converted to the bus voltage level by the DC-to-DC converter 144 and distributed via the voltage bus 145. It is noted that in embodiments where the output voltage at the fuel cell input node 128 is greater than the bus voltage, the size of the generator 124 may be reduced by designing the generator 124 for the fuel cell output voltage rather than the lower bus voltage.

Figure 4:
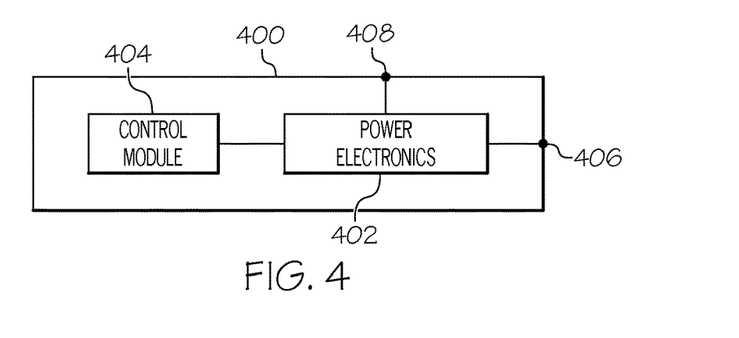
FIG. 4 is a block diagram of an exemplary turbine assembly electronics module suitable for use with the loss recovery assembly of FIG. 1 in conjunction with the management process of FIG. 3 in accordance with one or more embodiments.

FIG. 4 depicts an exemplary embodiment of an electronics module 400 suitable for use as the electronics module 126 in the turbine assembly 120 of FIG. 1 in conjunction with the management process 300 of FIG. 3. The electronics module 400 includes power electronics 402 coupled between the output of the generator 124 and the input node 128 of the vehicle electrical system 130, and the power electronics 402 generally represent the hardware components of the electronics module 400 that are configured to filter, rectify, or otherwise process the electrical energy output by the generator 124 and deliver the generated electrical energy to the vehicle electrical system 130. In this regard, the power electronics 402 has an input 406 coupled to the output of the generator 124, an output 408 coupled to the input node 128 to the vehicle electrical system 130, and the power electronics 402 convert input electrical energy received from the generator 124 at the input 406 to a voltage level at output 408 corresponding to a target voltage set point.

Additionally, the power electronics 402 may include circuitry configured to selectively dissipate the generated electrical energy in response to commands from a control module 404 of the electronics module 400. In this regard, the control module 404 generally represents the hardware, processing logic or other components of the electronics module 400 that are coupled to the ECU 160 and configured to support operations of the electronics module 126 described herein. In practice, the control module 404 may include or otherwise be realized as a processor, a controller, a microprocessor, a microcontroller, an application specific integrated circuit, a field programmable gate array, or any suitable programmable logic device. In one or more embodiments, the control module 404 receives indication of the target voltage set point from the ECU 160 and operates the power electronics 402 to convert the electrical energy received from the generator 124 at the input 406 to a voltage level substantially equal to the target voltage set point at the output 408. When the target voltage set point is less than the voltage at the input node 128, the control module 404 operates circuitry of the power electronics 402 to dissipate at least a portion of the electrical power recovered by the loss recovery assembly 102.

To briefly summarize, the subject matter described herein allows for the loss recovery assembly 102 to be designed and packaged independently of the compressor assembly 134. As a result, the plumbing from the cathode outlet downstream to the exhaust system 110 via the loss recovery assembly 102 may be simplified. Additionally, the turbine 122 and the generator 124 may be designed and sized independently of the compressor assembly 134, thereby allowing them to be optimized for the nominal cathode exit mass flow rate. An electronics module 126, 400 of the loss recovery assembly 102 may be utilized to load the generator 124 as needed by dissipating generated electrical energy to prevent generator overspeed. The electronics module 126, 400 can also be utilized to dissipate generated electrical energy to prevent overcharging the vehicle battery 146 or otherwise overpowering the vehicle electrical system 130. Thus, the turbine 122 may be realized using a fixed geometry, arranged effectively in parallel with the valve 106, and sized with greater degrees of freedom (e.g., independently of the generator 124 or the vehicle system 100) to achieve efficient operation for the typical cathode exit flow 114. Additionally, the generator 124 may then be sized for the fuel cell output voltage at node 128 (e.g., rather than the voltage of the voltage bus 145 or battery 146), thereby allowing the generator 124 size to be reduced, which, in concert with the design of the turbine 122 provides greater degrees of freedom from a packaging perspective. The compressor assembly 134 can similarly be designed independent of the turbine assembly 120, thereby providing greater degrees of freedom with respect to efficiency, plumbing, or packaging upstream of the fuel cell 104.

For the sake of brevity, conventional techniques related to turbines, turbo generators, loss recovery systems, compressors, fuel cells, fuel cell vehicles, vehicle electrical systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a control module or other processing system), facilitate the processes described above.

The foregoing description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first," "second," and other such numerical terms referring to structures do not imply a sequence or order unless clearly indicated by the context.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A system comprising:
   a fuel cell stack;
   a flow control valve downstream of the fuel cell stack to regulate a fluid flow exiting the fuel cell stack;
   a flow control assembly parallel to the flow control valve to generate electrical energy in response to a bypass portion of the fluid flow bypassing the flow control valve based on an orientation of the flow control valve with respect to the fluid flow;
   a conduit upstream of the flow control valve to provide fluid communication for the bypass portion of the fluid flow upstream of the flow control assembly; and
   a second conduit downstream of the flow control valve to provide fluid communication for the bypass portion of the fluid flow downstream of the flow control assembly.

2. The system of claim 1, further comprising an exhaust system downstream of the flow control valve and the flow control assembly.

3. The system of claim 2, wherein the conduit is disposed between the fuel cell stack and the flow control valve and the second conduit is disposed between the flow control valve and the exhaust system.

4. The system of claim 1, wherein a first electrical output of the fuel cell stack is coupled to a second electrical output of the flow control assembly at a common voltage level.

5. The system of claim 4, wherein the flow control assembly comprises:
   a turbine rotatable in response the bypass portion of the fluid flow; and
   a generator coupled to the turbine to generate the electrical energy in response to rotation of the turbine.

6. The system of claim 5, further comprising an electronics module coupled between the generator and the second electrical output to convert the electrical energy to an output voltage of the fuel cell stack.

7. A system comprising:
   a fuel cell stack having an exit fluid flow;
   a first conduit for the exit fluid flow;
   a valve disposed within the first conduit; and
   a turbine assembly to receive a bypass portion of the exit fluid flow via an inlet conduit upstream of the valve providing fluid communication between the first conduit and the turbine assembly based on an orientation of the valve with respect to the first conduit, wherein an outlet conduit downstream of the valve provides fluid communication downstream of the turbine assembly for the bypass portion from the turbine assembly to the first conduit.

8. The system of claim 7, wherein the turbine assembly provides a fluid path parallel to an intermediate portion of the first conduit having the valve disposed therein.

9. The system of claim 7, further comprising:
an exhaust system, the first conduit providing fluid communication between the fuel cell stack and the exhaust system and the valve being disposed between the fuel cell stack and the exhaust system.

10. The system of claim 7, wherein the turbine assembly comprises:
a turbine having an inlet coupled to the first conduit upstream of the valve to receive the bypass portion of the exit fluid flow; and
a generator coupled to the turbine to generate electrical energy resulting from the bypass portion.

11. The system of claim 10, further comprising an electronics module coupled between a first electrical output of the generator and a second electrical output of the fuel cell stack to control distribution of the electrical energy.

12. The system of claim 11, wherein the electronics module selectively dissipates at least a portion of the electrical energy.

13. The system of claim 10, wherein a voltage of the electrical energy corresponds to an output voltage of the fuel cell stack.

14. The system of claim 10, wherein the turbine comprises a fixed geometry turbine.

15. The system of claim 1, further comprising a control unit coupled to the flow control valve to adjust the orientation of the flow control valve based on humidity information for the fuel cell stack, wherein:
the orientation of the flow control valve influences the electrical energy generated by the flow control assembly; and
the electrical energy generated by the flow control assembly is at a voltage level corresponding to a voltage output of the fuel cell stack.

16. The system of claim 15, wherein:
the flow control assembly comprises:
a turbine having an inlet conduit upstream of the flow control valve to receive the bypass portion of the fluid flow; and
a generator coupled to the turbine to generate the electrical energy resulting from the bypass portion;
the orientation of the flow control valve influences the bypass portion; and
the control unit operates an electronics module coupled to the generator to dissipate at least a portion of the electrical energy in response to a potential overspeed condition.

17. The system of claim 15, wherein:
the flow control assembly comprises:
a turbine having an inlet conduit upstream of the flow control valve to receive the bypass portion of the fluid flow; and
a generator coupled to the turbine to generate the electrical energy resulting from the bypass portion;
the orientation of the flow control valve influences the bypass portion; and
the control unit operates an electronics module coupled to the generator to dissipate at least a portion of the electrical energy in response to a potential excess energy condition.

18. The system of claim 1, further comprising a compressor assembly upstream of the fuel cell, wherein the compressor assembly is physically separate from a turbine of the flow control assembly.

19. The system of claim 18, wherein:
the flow control assembly provides the electrical energy at an input node of a vehicle electrical system including a voltage bus; and
the compressor assembly is coupled to the voltage bus.

20. The system of claim 1, wherein the flow control valve is disposed between the conduit and the second conduit.

* * * * *